(12) United States Patent
Schletz et al.

(10) Patent No.: US 9,764,275 B2
(45) Date of Patent: Sep. 19, 2017

(54) MEMBRANE MODULE CAPABLE OF OPERATION IN EXTREME TEMPERATURE ENVIRONMENTS

(71) Applicant: Generon IGS, Inc., Houston, TX (US)

(72) Inventors: Jeff C. Schletz, Clayton, CA (US);
Frederick L. Coan, Antioch, CA (US);
Karen Skala, Davis, CA (US); Marc Straub, Brentwood, CA (US); Kyle A. Jensvold, Walnut Creek, CA (US);
John A. Jensvold, Benicia, CA (US);
Luis Brizuela, Antioch, CA (US)

(73) Assignee: Generon IGS, Inc., Houston, TX (US)

( * ) Notice: Subject to any disclaimer, the term of this patent is extended or adjusted under 35 U.S.C. 154(b) by 277 days.

(21) Appl. No.: 14/746,153

(22) Filed: Jun. 22, 2015

(65) Prior Publication Data

US 2016/0045858 A1    Feb. 18, 2016

Related U.S. Application Data

(60) Provisional application No. 62/036,192, filed on Aug. 12, 2014.

(51) Int. Cl.
*B01D 53/22* (2006.01)
*B01D 63/02* (2006.01)
(Continued)

(52) U.S. Cl.
CPC ............ *B01D 53/228* (2013.01); *B01D 63/02* (2013.01); *B01D 63/021* (2013.01); *B01D 69/02* (2013.01); *B01D 69/08* (2013.01);
*B01D 71/50* (2013.01); *B01D 2053/224* (2013.01); *B01D 2256/10* (2013.01); *B01D 2256/12* (2013.01);
(Continued)

(58) Field of Classification Search
CPC B01D 69/02; B01D 2313/02; B01D 2313/20;
B01D 2257/104; B01D 2256/10; B01D 2258/06; B01D 2313/90; B01D 63/021;
B01D 53/228; B01D 2257/102; B01D 2256/12; B01D 71/50; B01D 69/08;
(Continued)

(56) References Cited

U.S. PATENT DOCUMENTS 4,664,990 A * 5/1987 Clark .................. C03C 3/064
29/623.1
4,783,201 A * 11/1988 Rice .................... B01D 53/22
95/52

(Continued)

*Primary Examiner* — Anthony Shumate
(74) *Attorney, Agent, or Firm* — William H. Eilberg

(57) ABSTRACT

A module having polymeric gas-separation membranes is capable of operation in extreme temperature environments. In one embodiment, the module includes polymeric fiber membranes, a tubesheet for holding the membranes, and a sleeve encasing the membranes, all of which are made of materials having coefficients of thermal expansion which differ from each other by not more than about 10%. In another embodiment, the membranes, the tubesheet, and the sleeve are all made of materials having a glass transition temperature greater than a highest anticipated temperature of operation of the module. In another embodiment, the module includes a head, and a clamshell having multiple protrusions which engage corresponding grooves in the head and in at least two grooves formed in the tubesheet.

12 Claims, 3 Drawing Sheets

(51) Int. Cl.
  *B01D 69/02* (2006.01)
  *B01D 69/08* (2006.01)
  *B01D 71/50* (2006.01)

(52) U.S. Cl.
  CPC .. *B01D 2257/102* (2013.01); *B01D 2257/104* (2013.01); *B01D 2258/06* (2013.01); *B01D 2313/02* (2013.01); *B01D 2313/20* (2013.01); *B01D 2313/90* (2013.01)

(58) Field of Classification Search
  CPC ... B01D 63/02; B01D 2053/224; B01D 53/22
  See application file for complete search history.

(56) References Cited

U.S. PATENT DOCUMENTS

| | | | | |
|---|---|---|---|---|
| 4,800,019 | A * | 1/1989 | Bikson | B01D 63/022 |
| | | | | 210/321.8 |
| 4,881,953 | A | 11/1989 | Prasad | |
| 4,955,993 | A * | 9/1990 | Sanders, Jr. | B01D 53/22 |
| | | | | 264/184 |
| 5,164,081 | A * | 11/1992 | Nichols | B01D 63/02 |
| | | | | 210/232 |
| 5,211,728 | A * | 5/1993 | Trimmer | B01D 53/22 |
| | | | | 128/205.11 |
| 5,242,636 | A * | 9/1993 | Sluma | B01D 69/08 |
| | | | | 264/129 |
| 5,498,278 | A * | 3/1996 | Edlund | B01D 53/22 |
| | | | | 55/524 |
| 6,290,756 | B1 * | 9/2001 | Macheras | B01D 53/22 |
| | | | | 156/294 |
| 6,712,131 | B1 * | 3/2004 | Brinkman | B01D 53/22 |
| | | | | 165/158 |
| 7,497,894 | B2 | 3/2009 | Jeffers | |
| 7,517,388 | B2 | 4/2009 | Jensvold | |
| 7,578,871 | B2 | 8/2009 | Jensvold | |
| 7,662,333 | B2 | 2/2010 | Coan | |
| 9,186,622 | B1 * | 11/2015 | Ranjan | B01D 53/228 |
| 2001/0020365 | A1 * | 9/2001 | Kubo | F28D 15/0266 |
| | | | | 62/1 |
| 2004/0045893 | A1 * | 3/2004 | Watanabe | B01D 63/022 |
| | | | | 210/321.79 |
| 2007/0134296 | A1 * | 6/2007 | Burgermeister | A61F 2/91 |
| | | | | 424/426 |
| 2008/0034795 | A1 * | 2/2008 | Adam | C03C 14/004 |
| | | | | 65/36 |
| 2010/0233146 | A1 * | 9/2010 | McDaniel | A01N 63/02 |
| | | | | 424/94.2 |
| 2012/0031831 | A1 * | 2/2012 | Kanougi | B01D 63/02 |
| | | | | 210/321.61 |
| 2012/0304856 | A1 * | 12/2012 | Kanetsuki | B01D 53/228 |
| | | | | 95/47 |
| 2013/0263739 | A1 * | 10/2013 | Galea | B01D 63/02 |
| | | | | 96/10 |
| 2013/0331814 | A1 * | 12/2013 | Fulton, III | A61M 25/1011 |
| | | | | 604/500 |
| 2014/0053726 | A1 * | 2/2014 | Evosevich | B01D 67/0067 |
| | | | | 95/54 |
| 2014/0116249 | A1 * | 5/2014 | Evosevich | B01D 63/02 |
| | | | | 95/47 |
| 2014/0208947 | A1 * | 7/2014 | Fautsch | B01D 63/021 |
| | | | | 96/8 |
| 2014/0208948 | A1 * | 7/2014 | Cao | B01D 63/022 |
| | | | | 96/8 |
| 2014/0360365 | A1 * | 12/2014 | Wynn | B01D 53/22 |
| | | | | 95/45 |
| 2015/0034546 | A1 * | 2/2015 | Inuzuka | B01D 63/04 |
| | | | | 210/321.89 |
| 2015/0053085 | A1 * | 2/2015 | Mahley, III | B01D 63/024 |
| | | | | 96/8 |
| 2015/0174533 | A1 * | 6/2015 | Li | B01D 53/22 |
| | | | | 95/45 |
| 2015/0204536 | A1 * | 7/2015 | Singh | F28B 9/10 |
| | | | | 95/8 |
| 2015/0316075 | A1 * | 11/2015 | Nakajima | F25B 41/003 |
| | | | | 62/515 |
| 2015/0344146 | A1 * | 12/2015 | Theodore | B01D 63/022 |
| | | | | 95/51 |
| 2016/0151744 | A1 * | 6/2016 | Visser | B01D 63/022 |
| | | | | 96/8 |
| 2017/0001148 | A1 * | 1/2017 | Kulkarni | B01D 53/228 |

\* cited by examiner ered by the hollow fibers (known as the shell side) cannot pass through the tubesheets.
MEMBRANE MODULE CAPABLE OF OPERATION IN EXTREME TEMPERATURE ENVIRONMENTS

CROSS-REFERENCE TO PRIOR APPLICATION

Priority is claimed from U.S. provisional patent application Ser. No. 62/036,192, filed Aug. 12, 2014, the entire disclosure of which is hereby incorporated by reference.

BACKGROUND OF THE INVENTION

The present invention relates to the non-cryogenic separation of gas mixtures. The invention provides an improved module containing polymeric fiber membranes, for use in the separation of gases such as air, wherein the module may be used through a wide range of temperatures.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

Alternatively, the gas can be introduced from the shell side of the module. In this case, the permeate is withdrawn from the bore side, and the non-permeate is taken from the shell side.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

Fiber membrane modules of the prior art must be maintained in a relatively limited temperature range, typically between about 40° C. and 55° C. Due to differing coefficients of thermal expansion of the various components of the module, operation outside this range may cause cracks in the module. When cracks occur, gases may leak from the module, reducing or destroying its effectiveness.

Also, operation at high temperatures may cause "creep", or thermal distortion, in some of the plastic components. This distortion may also cause leaks in, or outright destruction of, the module, especially in view of the fact that the pressure inside the module is much higher than ambient pressure.

The present invention provides an improved fiber membrane module which is suitable for operation across a wide range of temperatures, and which, in particular, may be operated in extreme temperature environments, while retaining its mechanical integrity, and without degradation of performance of the module.

SUMMARY OF THE INVENTION

The present invention comprises an improved fiber membrane module for gas separation, the module being capable of operation in extreme temperature environments.

The components of the module of the present invention have coefficients of thermal expansion which are similar, within about 10% of each other. This feature tends to prevent cracking due to expansion or contraction of components at different rates.

In another feature of the present invention, the major components of the module, including the fiber membranes, the tubesheet, and the sleeve which encloses the module, are selected to have a glass transition temperature ($T_g$) which is typically at least about 111° C., so that said components will be maintained below their $T_g$ even in very high temperature environments. This feature tends to insure that the components retain their rigidity even under conditions of extreme heat.

In one embodiment, the module of the present invention may have a double clamshell structure. The clamshell is a cylindrical component near the head of the module, and located inside the outer casing of the module, the clamshell serving to attach the head to the tubesheet. In this embodiment, the tubesheet includes at least two grooves, and the clamshell has protrusions which correspond to the grooves, and another protrusion which engages a groove in the head. The clamshell therefore attaches the head to the tubesheet by engagement with the grooves. By providing two or more grooves formed in the tubesheet, instead of only one, the force of attachment is distributed over several grooves, thereby reducing the force applied to any one groove, and reducing the risk of rupture due to internal pressure and/or excessive heat.

The invention is not limited to the double clamshell structure, but may be practiced with other module arrangements, including those of the prior art.

The present invention therefore has the primary object of providing a fiber membrane module capable of operation in extreme temperature environments.

The invention has the further object of providing a fiber membrane module which minimizes or eliminates cracking due to extremes of temperature.

The invention has the further object of providing a fiber membrane module, the components of which are reliably held together even when the pressure inside the module is high, and/or when the temperature of operation is high.

The invention has the further object of improving the operation of gas separation membrane modules, especially modules operated at high temperatures.

The reader skilled in the art will recognize other objects and advantages of the present invention, from a reading of the following brief description of the drawings, the detailed description of the invention, and the appended claims.

DETAILED DESCRIPTION OF THE INVENTION

The present invention comprises a fiber membrane module capable of operation in extreme temperature environments. The invention resides, in part, in the choice of composition of some module components, and may also reside in the specific structure of the module, as will be explained below.

Figure 1:
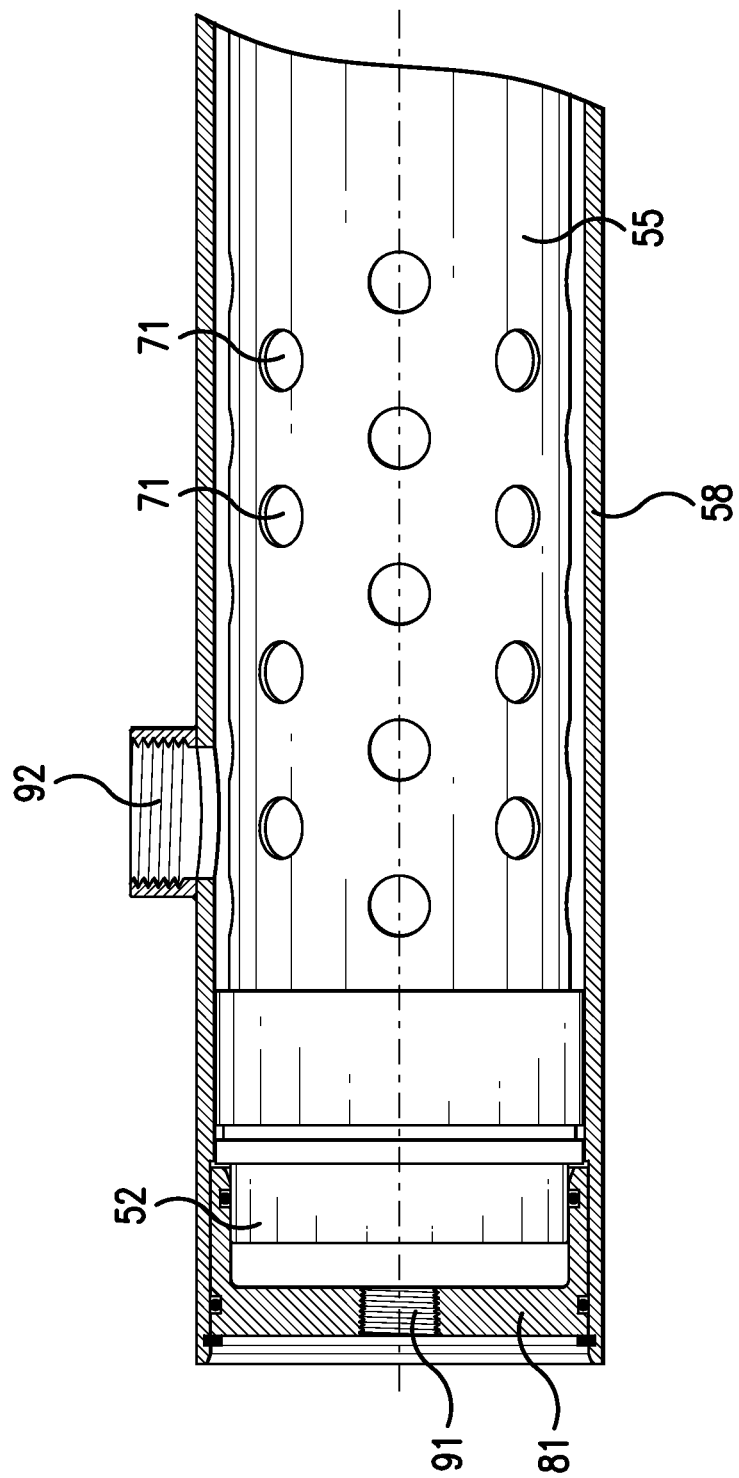
FIG. 1 provides a fragmentary cross-sectional view of a fiber membrane module, which module can be used with the present invention.
Figure 2:
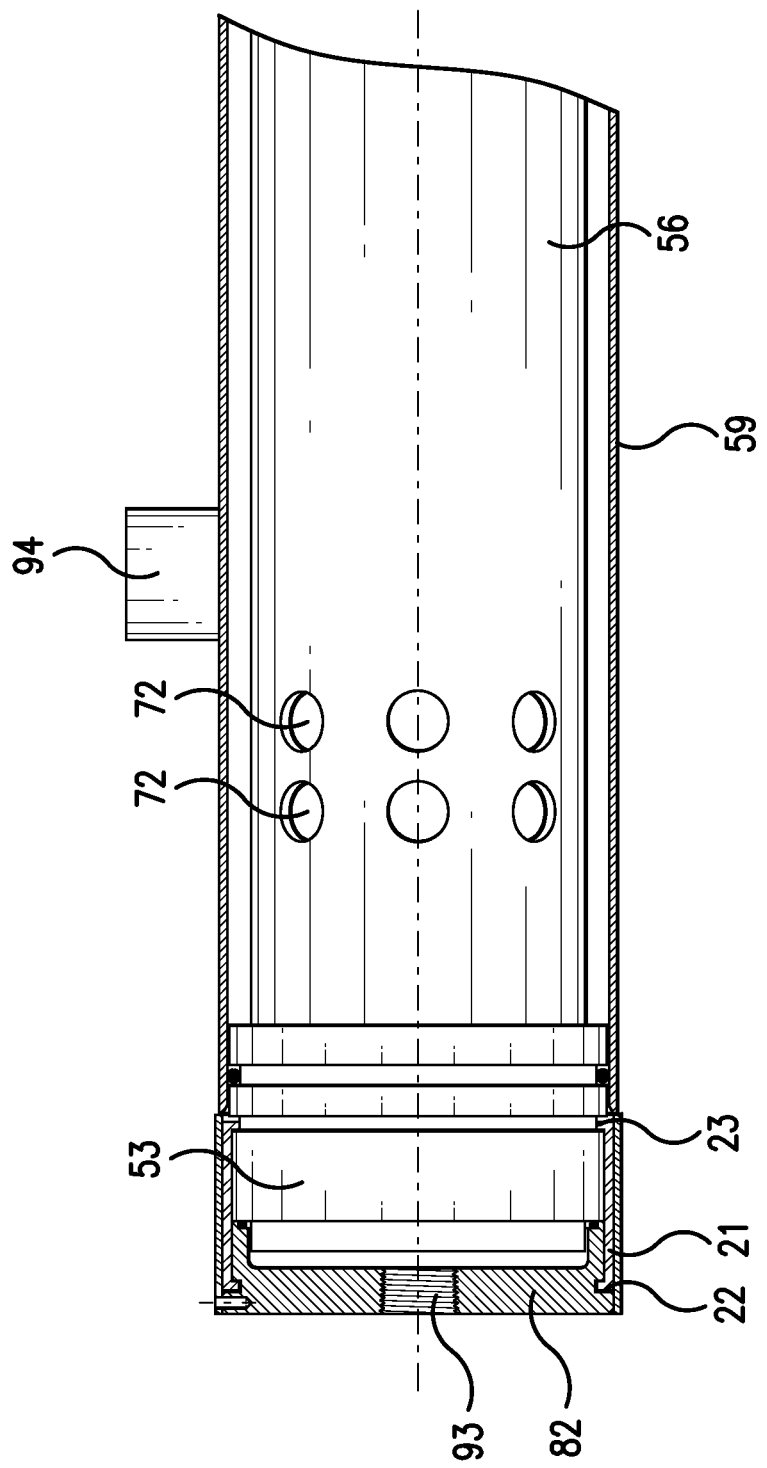
FIG. 2 provides a fragmentary cross-sectional view of a fiber membrane module having a clamshell structure at its head end, and which module can also be used with the FIG. 3 provides a fragmentary cross-sectional view of a fiber membrane module having a double clamshell structure at its head end, and which can be used as part of the present invention.
Figure 3:
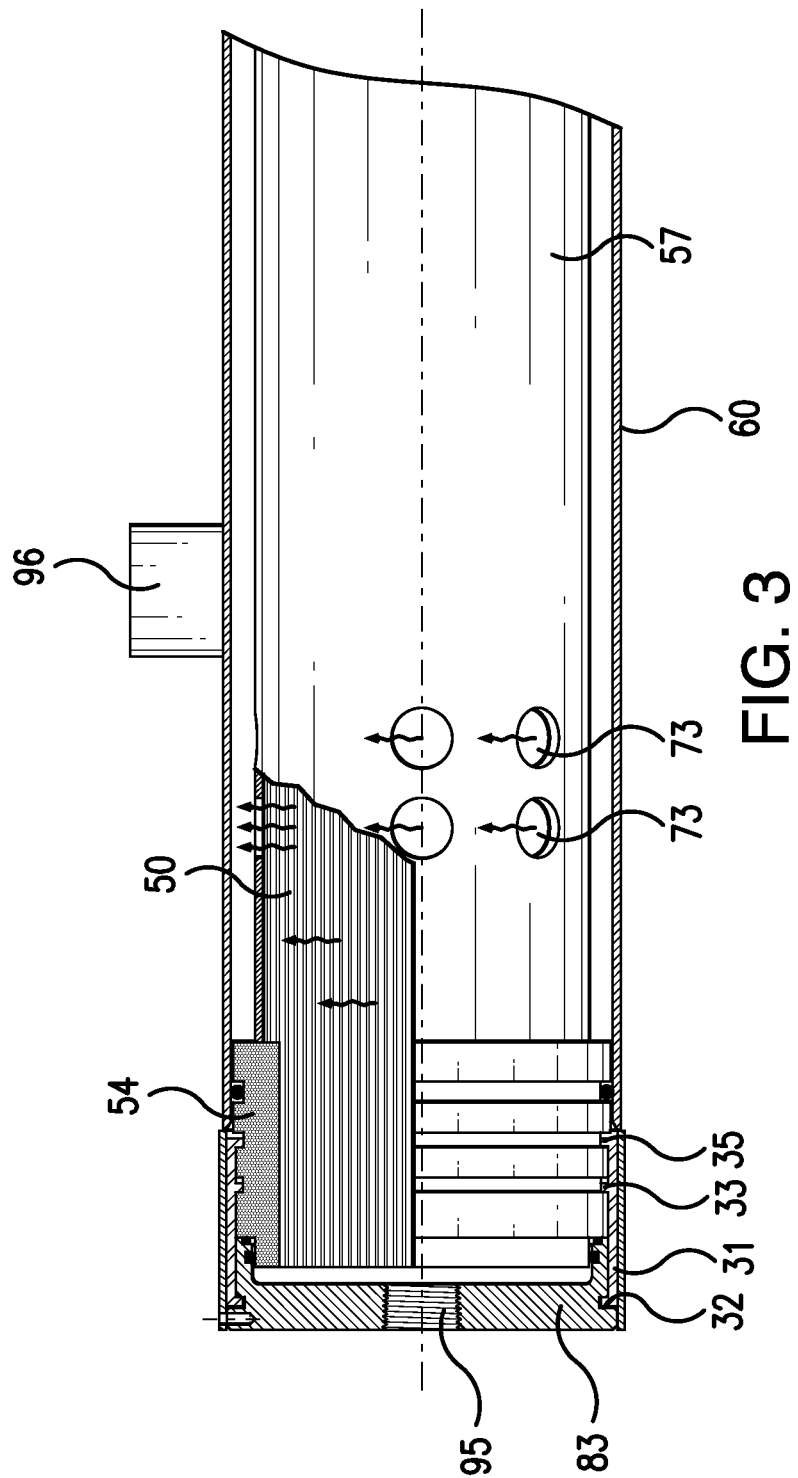

In general, and as illustrated in FIGS. 1-3, a fiber membrane module includes polymeric fibers 50 (visible in the broken-away portion of FIG. 3, but not explicitly shown in FIGS. 1 and 2), at least one tubesheet (indicated by reference numerals 52-54 in FIGS. 1-3, respectively), and a sleeve (55-57 in FIGS. 1-3, respectively), having the form of a length of pipe or tubing, all of which are enclosed in a module casing (58-60 in FIGS. 1-3, respectively).

Holes 71 formed in sleeve 55 allow permeate gas to escape from the bundle. Holes 72 and 73, in FIGS. 2 and 3, have a similar purpose. Not all holes are shown, for convenience of illustration.

Each module has a head, indicated by reference numerals 81, 82, and 83 in FIGS. 1-3, respectively. Pressurized air, which is the feed gas, is introduced into the module at port 91, and an oxygen-enriched stream, which comprises the permeate gas in this embodiment, exits the module through port 92. Similar ports are provided in the other embodiments (see reference numerals 93 and 94 in FIGS. 2, and 95 and 96 in FIG. 3). The invention can be used with other gases, in which case the identity of the permeate and retentate gases would be different.

To achieve the objects of the present invention, the membrane, the tubesheet, and the sleeve should all be made of materials which have similar coefficients of thermal expansion. Also, these components should have a high glass transition temperature, or $T_g$. In particular, the $T_g$ should be greater than the highest temperature of anticipated operation of the module.

The term "glass transition temperature", as applied to plastic materials, means the temperature below which the plastic is relatively rigid, similar to glass. At or above the glass transition temperature, the material softens, and becomes more like rubber. Thus, below the $T_g$, one can apply stress to the plastic without appreciably deforming it, but above the $T_g$, stress on the material will readily cause deformation. $T_g$ is therefore also known as a heat deformation temperature.

In the present invention, the glass transition temperature of the membrane, the tubesheet, and the sleeve should be greater than the desired upper temperature limit for the module.

For a module which is to be capable of withstanding temperature cycling ranges from about −65° C. to about 110° C., one should select module components that have both high glass transition temperatures (>110° C.) and thermal expansion coefficients which are as closely matched as possible. By using internal module components that all have expansion coefficients within 10% of each other, one avoids thermally induced cracks due to temperature cycling.

The module of the present invention is intended to be durable, and operative, over a wide range of temperatures, as set forth above, and at a pressure of 200 psig. The module sleeve is preferably made of polycarbonate or CPVC (chlorinated polyvinyl chloride), to match the coefficients of thermal expansion of the fibers and the tubesheet, while still maintaining mechanical durability at the extremes of temperature.

The various components of the module are designed, selected and/or processed to give maximum durability. The hollow fiber membranes are designed for high pressure operation and thermal extremes, due to the use of a thick walled fiber with commercial gas separation properties. The thicker wall gives good pressure stability even at elevated pressures. As used herein, the term thick-walled fiber could comprise a fiber having an outside diameter and an inside diameter, respectively, of 150 and 100 microns, implying a fiber wall thickness of 25 microns. The latter figures are exemplary, and are not intended to limit the invention.

The tubesheet material is a four-component mixture that has a high $T_g$, greater than 111° C., while still maintaining toughness (ultimate elongation>5%). The mixture is machineable, and chemically compatible with the membrane materials, and has a low tendency towards "creep".

The following tables show a preferred composition of the above-described mixture, according to the present invention, and, for comparison, a typical composition of the prior art.

For the present invention, having a relatively high $T_g$ of 111° C., a preferred composition is as follows:

| Component | Parts (by mass) |
| --- | --- |
| Epoxy resin | 100 |
| Hardener | 90 |
| Toughener | 35 |
| Catalyst | 1.5 |

By contrast, a low $T_g$ composition of the prior art, in which the $T_g$ is in the range of about 90-100° C., would have the following composition:

| Component | Parts (by mass) |
| --- | --- |
| Epoxy resin | 100 |
| Hardener | 75 |
| Toughener | 37 |
| Catalyst | 1.3 |

In the composition of the present invention, the preferred epoxy is the material sold under the trademark DER 331, the hardener is NMA (nadic methyl anhydride), the toughener is polyglycol 15-200, and the catalyst is BDMA (benzyldimethylamine).

The present invention also includes a novel double clamshell structure for the module. As shown in FIG. 2, clamshell 21 has a protrusion which fits into groove 23 formed in the tubesheet. The clamshell is disposed inside the module casing, and serves to keep the module head in contact with the tubesheet. The clamshell engages the head with the help of protrusion 22, which engages a corresponding groove in the head.

The structure of FIG. 2, which has been used in the prior art, has the disadvantage that the attachment of the head to the module is dependent on one grip, namely the engagement of the protrusion of the clamshell within the single groove formed in the tubesheet. High pressure inside the module may tend to separate the components. The module head is typically made of metal, so a groove in the metal is likely to remain intact even at high temperatures and pressures. But in the case of the grooves in the tubesheet, which is made of plastic, the effect of heat and pressure is more problematic. Even below $T_g$, plastic parts may distort or "creep" over time, and the grooves will distort in a manner which relieves the pressure. That is, the grooves may tend to curve towards the head, reaching the point at which the clamshell can no longer reliably grip the tubesheet.

With only one groove, as is shown in FIG. 2, all of the force needed to withstand internal pressure is applied along that one groove.

FIG. 3 shows a module structure which comprises an improvement over that of FIG. 2. In FIG. 3, there are two grooves 33 and 35, formed in the tubesheet, the grooves being engaged by clamshell 31, which has corresponding protrusions for engagement with the grooves. The clamshell engages a groove in the head by means of protrusion 32. Thus, the force needed to hold the components of the module together is distributed over two grooves. In general, one could provide a larger plurality of grooves in the tubesheet, with a corresponding change in the number of protrusions provided in the clamshell. In general, a double or multiple clamshell structure more evenly distributes the forces needed to withstand internal pressure, so as to minimize the effects of "creep", and allowing for the effects of extreme temperatures.

The double clamshell structure avoids the cost of a high-pressure housing to contain the pressure, since the pressure is contained only at the tubesheet ends of the module and transfers no compressive stress on the module bundle.

It should be understood, however, that the module may also be made using a traditional cartridge structure, shown in FIG. 1, in which stress would be transferred through the two tubesheets to an external sleeve material and/or a central core tube for the module bundle.

Although some of the structure shown in FIGS. 1 and 2 is known in the prior art, the embodiments of FIGS. 1 and 2 are still considered part of the present invention, to the extent that they are constructed according to the criteria specified above, namely that the components have similar coefficients of thermal expansion, and/or that these components have a high glass transition temperature.

The present invention can be further illustrated through the following examples.

Example 1

A module was made of a modified polycarbonate fiber, a high-$T_g$ epoxy resin, and a polycarbonate external sleeve, in which all of these components had a $T_g$ greater than 110° C. The fiber had a $T_g$ of 230° C., the polycarbonate sleeve had a $T_g$ of 130° C., and the tubesheet had a $T_g$ of 111° C. The coefficients of thermal expansion all ranged from 60 to 70 ppm/C. The module had the double-clamshell end enclosure shown in FIG. 3.

The performance of the module did not change after exposure to a range of temperatures of −65° C. to 77° C. for 24 hours. The module was found to be capable of operating at 200 psig and 77° C. for 500 hours, with less than a 5% change in performance with regard to effectiveness of air separation.

Example 2

The present Example is based on the prior art, and is presented for comparison with the module made according to the present invention.

A module was made with a similar fiber and tubesheet material as used in Example 1, but had aluminum or fiberglass as the sleeve material. The module was found to experience cracking of the tubesheet when the module was exposed to a temperature of −30° C., because of the mismatch in the coefficients of thermal expansion. Aluminum and fiberglass have thermal expansion coefficients of about 22, compared with 60-70 ppm/C for the tubesheet and fiber.

Example 3

A module was made with similar fiber and tubesheet materials as in the Examples above, but with a PVC sleeve. Although these components had a good match of coefficients of thermal expansion, the PVC sleeve had a $T_g$ which was lower than 80° C. While the tubesheet did not crack, the module distorted and failed when operated at 77° C. and 200 psig.

The invention can be modified in various ways. The invention is not limited to a specific structure for the module. The materials used for making the module components can be varied, subject to the limitations described above. As noted above, the module can be made to use bore-side feed or shell-side feed. These and other variations should be considered within the spirit and scope of the following claims.

What is claimed is:

1. In a gas separation membrane module, the module including a plurality of hollow fibers made from a polymeric membrane which permits selective permeation of gases therethrough, the module having at least one tubesheet which anchors the fibers, and a perforated sleeve positioned around the fibers,
   the improvement wherein the membrane, the tubesheet, and the sleeve are all made of materials having coefficients of thermal expansion which differ from each other by not more than about 10%.

2. The improvement of claim 1, wherein the membrane, the tubesheet, and the sleeve are all made of materials having a glass transition temperature greater than a highest anticipated temperature of operation of the module.

3. The improvement of claim 2, wherein the highest anticipated temperature of operation of the module is at least about 111° C.

4. The improvement of claim 1, wherein the module also includes a head, wherein the module is at least partly enclosed by a casing, and wherein the module includes a clamshell positioned inside the casing, the clamshell contacting both the head and the tubesheet, wherein the clamshell has at least one protrusion which is engaged in a groove formed in the head, and at least two protrusions which are engaged in grooves formed in the tubesheet.

5. In a gas separation membrane module, the module including a plurality of hollow fibers made from a polymeric membrane which permits selective permeation of gases therethrough, the module having at least one tubesheet which anchors the fibers, and a perforated sleeve positioned around the fibers,
    the improvement wherein the membrane, the tubesheet, and the sleeve are all made of materials having a glass transition temperature greater than a highest anticipated temperature of operation of the module.

6. The improvement of claim 5, wherein the highest anticipated temperature of operation of the module is at least about 111° C.

7. The improvement of claim 6, wherein the membrane, the tubesheet, and the sleeve are all made of materials having coefficients of thermal expansion which differ from each other by not more than about 10%.

8. The improvement of claim 7, wherein the module also includes a head, wherein the module is at least partly enclosed by a casing, and wherein the module includes a clamshell positioned inside the casing, the clamshell contacting both the head and the tubesheet, wherein the clamshell has at least one protrusion which is engaged in a groove formed in the head, and at least two protrusions which are engaged in grooves formed in the tubesheet.

9. In a gas separation membrane module, the module including a plurality of hollow fibers made from a polymeric membrane which permits selective permeation of gases therethrough, the module being held within an outer casing, the module having at least one tubesheet which anchors the fibers, and a head comprising an external end surface of the module,
    the improvement comprising a clamshell positioned inside the casing, the clamshell contacting both the head and the tubesheet, wherein the clamshell has at least one protrusion which is engaged in a groove formed in the head, and at least two protrusions which are engaged in grooves formed in the tubesheet.

10. The improvement of claim 9, wherein the membrane, the tubesheet, and the sleeve are all made of materials having coefficients of thermal expansion which differ from each other by not more than about 10%.

11. The improvement of claim 10, wherein the membrane, the tubesheet, and the sleeve are all made of materials having a glass transition temperature greater than a highest anticipated temperature of operation of the module.

12. The improvement of claim 11, wherein the highest anticipated temperature of operation of the module is at least about 111° C.

\* \* \* \* \*